(12) United States Patent
Bates et al.

(10) Patent No.: US 6,703,051 B1
(45) Date of Patent: Mar. 9, 2004

(54) PROCESS FOR SEPARATING AND RECOVERING PROTEIN AND ISOFLAVONES FROM A PLANT MATERIAL

(75) Inventors: Gregory A. Bates, Collinsville, IL (US); Barbara A. Bryan, University City, MO (US)

(73) Assignee: Solae, LLC, St. Louis, MO (US)

( * ) Notice: Subject to any disclaimer, the term of this patent is extended or adjusted under 35 U.S.C. 154(b) by 0 days.

(21) Appl. No.: 09/170,514

(22) Filed: Oct. 13, 1998

(51) Int. Cl.[7] .................. A61K 35/78; A01N 65/00; A23J 1/00; C07K 14/00; C07K 16/00
(52) U.S. Cl. .................. 424/725; 530/370; 530/412; 530/416; 426/656
(58) Field of Search .................. 435/254.3; 424/195.1, 424/725; 530/370, 412, 416; 549/403; 426/656

(56) References Cited

U.S. PATENT DOCUMENTS

| | | | |
|---|---|---|---|
| 4,157,984 A | 6/1979 | Zilliken | 252/407 |
| 4,218,489 A | 8/1980 | Zilliken | 426/545 |
| 4,232,122 A | 11/1980 | Zilliken | 453/52 |
| 4,264,509 A | 4/1981 | Zilliken | 260/345.2 |
| 4,366,082 A | 12/1982 | Zilliken | 252/404 |
| 4,366,248 A | 12/1982 | Zilliken | 435/125 |
| 4,390,559 A | 6/1983 | Zilliken | 426/545 |
| 4,428,876 A | 1/1984 | Iwamura | 260/123.5 |
| 5,141,746 A | 8/1992 | Fleury et al. | 424/195.1 |
| 5,248,804 A * | 9/1993 | Nardelli et al. | 558/147 |
| 5,637,561 A | 6/1997 | Shen et al. | 514/2 |
| 5,670,632 A * | 9/1997 | Chaihorsky | 536/8 |
| 5,679,806 A | 10/1997 | Zheng et al. | 549/403 |
| 5,702,752 A | 12/1997 | Gugger et al. | 426/634 |
| 5,726,034 A | 3/1998 | Bryan et al. | 435/68.1 |
| 5,792,503 A | 8/1998 | Gugger et al. | 426/634 |
| 5,804,234 A * | 9/1998 | Suh et al. | 426/69 |
| 5,851,792 A | 12/1998 | Shen et al. | 435/68.1 |
| 5,932,221 A | 8/1999 | Day | 424/514 |
| 6,020,471 A | 2/2000 | Johns et al. | 536/8 |

FOREIGN PATENT DOCUMENTS

| | | |
|---|---|---|
| JP | 59-232052 A | 12/1984 |
| JP | B-62-25016 | 2/1987 |
| JP | 62126185 A | 6/1987 |
| JP | 62126186 A | 6/1987 |
| JP | 63245648 A | 10/1988 |
| JP | 1-258669 | 10/1989 |
| JP | 04-266898 | 9/1992 |
| JP | 5170756 | 7/1993 |
| JP | 53-28929 A | 12/1993 |
| JP | 017173148 | 7/1995 |
| JP | 07236439 A | 9/1995 |
| JP | 8214787 | 8/1996 |
| JP | 82-83283 A | 10/1996 |
| JP | 8291191 A | 11/1996 |
| WO | WO 93/23069 | 11/1993 |
| WO | WO 95/10530 | 4/1995 |
| WO | WO 98/10665 | 3/1998 |

OTHER PUBLICATIONS

Seo et al., *Improved High–Performance Liquid Chromatographic Analysis of Phenolic Acids and Isoflavonoids From Soybean Protein Products*, J. Agric. Food Chem., (1984), vol. 32, No. 3, pp. 530–533.

*Determination of Isoflavones in Soybean Flours, Protein Concentrates, and Isolates*, Eldridge, J. Argic. Food Chem., vol. 30, pp. 353–55 (1982).

*Soybean Isoflavones, Characterization, Determination, and Antifungal Activity*, NAIM et al., J. Agric. Food. Chem., vol. 22, No. 5, pp 806–10 (1974).

*Quantitation of Phytoestrogens in Legumes by HPLC*, Franke et al., J. Agric. Food Chem., vol. 42, pp. 1905–13 (1994).

*An Investigation on the Extraction and Concentration of Isoflavones in Soy–Based Products*, Nguyenle T. et al., J. Pharm. Biomed. Anal., 14:221–232 (1995).

*Isoflavones and Their Conjugates in Soy Foods: Extraction Conditions and Analysis by HPLC–Mass Spectrometry*, Barnes S. et al., J. Agric. Food Chem., 42:2466–2474 (1994).

\* cited by examiner

Primary Examiner—David M. Naff
Assistant Examiner—Deborah K Ware
(74) Attorney, Agent, or Firm—James L. Cordek; Richard B. Taylor; Barbara A. Bryan

(57) ABSTRACT

A method is provided for separating and recovering protein and isoflavones from a plant material. A clarified protein extract of the plant material is prepared and contacted with a polar ion exchange resin, such as an anion exchange resin allowing the isoflavones in the extract to bind with the ion exchange resin and depleting the extract of isoflavones. A protein extract which has been depleted of isoflavones is separated from the ion exchange resin, and an isoflavone depleted protein material is recovered from the isoflavone depleted extract. After removal of the isoflavone depleted extract from the resin, the isoflavones are separated and recovered from the ion exchange resin. Recovered isoflavone glycosides and isoflavone glycoside conjugates may be converted to their corresponding aglucone isoflavone form.

34 Claims, 1 Drawing Sheet

| Compound | R₁ | R₂ | R₃ | R₄ |
|---|---|---|---|---|
| Genistein | OH | H | OH | OH |
| Daidzein | OH | H | H | OH |
| Glycitein | OH | OCH₃ | H | OH |
| Biochanin A | OH | H | OH | OCH₃ |
| Formononetin | OH | H | H | OCH₃ |

| Compound | R₁ | R₂ | R₃ | R₄ |
|---|---|---|---|---|
| Genistin | H | H | OH | OH |
| 6'-OMal genistin | COCH₂CO₂H | H | OH | OH |
| 6'-OAc genistin | COCH₃ | H | OH | OH |
| Daidzin | H | H | H | OH |
| 6'-OMal daidzin | COCH₂CO₂H | H | H | OH |
| 6'-OAc daidzin | COCH₃ | H | H | OH |
| Glycitin | H | OCH₃ | H | OH |
| 6'-OMal glycitin | COCH₃ | OCH₃ | H | OH |

PROCESS FOR SEPARATING AND RECOVERING PROTEIN AND ISOFLAVONES FROM A PLANT MATERIAL

FIELD OF THE INVENTION

This invention relates to a method for separating and recovering protein and isoflavones from a plant material containing protein and isoflavones, and more particularly to a method of using ion exchange to separate and recover protein and isoflavones from a plant material.

BACKGROUND OF THE INVENTION

Plant proteins provide an important source of nutrition worldwide. For example, soybeans are an excellent source of nutrition for both humans and animals. Soy protein is commercially extracted from soybeans to provide an inexpensive, highly nutritious source of protein. An isolated soy protein can be utilized in numerous dietary applications for both its nutritional benefits as well as functional characteristics the protein lends to a food or beverage. Some common foods in which soy protein is used include ground meats, emulsified meats, and marinated meats; beverages such as nutritional beverages, sports beverages, protein fortified beverages, juices, milk, milk alternatives, and weight loss beverages; cheeses such as hard and soft cheeses, cream cheese, and cottage cheese; frozen desserts such as ice cream, ice milk, low fat frozen desserts, and non-dairy frozen desserts; yogurts; soups; puddings; bakery products; salad dressings; and dips and spreads such as mayonnaise and chip dips.

Certain plants such as soybeans, peas, beans, and other legumes contain isoflavones as well as protein. Isoflavones are phytoestrogenic compounds which have been found to provide humans with a variety of health benefits. For example, the isoflavones present in soy are genistein, daidzein, glycitein, formononetin, shown in FIG. 1, and their natural glycosides and glycoside conjugates, shown in FIG. 2. As used herein, "Mal" is defined as "malonyl" and "Ac" is defined as "acetyl". Another biologically active isoflavone found in plants other than soy is biochanin A, shown in FIG. 1.

The health benefits associated with these isoflavones are numerous, and continue to be discovered. For example, some of these isoflavones have been found to inhibit the development of breast and prostate cancers, and to induce apoptosis in breast and prostate cancer cells. Isoflavones extracted from soy have also been found to inhibit the development of atherosclerosis, to lower the blood serum concentration of total cholesterol and low density lipoprotein cholesterol, to reduce or prevent menopausal symptoms, to inhibit the development of Alzheimer's disease, and to inhibit bone loss due to osteoporosis.

Isoflavones have been associated with the bitter, beany taste of legumes which contain significant amounts of the compounds. Accordingly, it is desirable to separate and recover both an isoflavone-depleted, pleasant-tasting protein material and the health-beneficiary isoflavones from a plant material containing isoflavones and protein.

Methods are known in the art for separating isoflavones from a plant material containing protein and isoflavones. For example, U.S. Pat. No. 5,679,806 provides a process for extracting, isolating, and purifying isoflavones from a plant material in which the plant material is extracted with an alcohol solvent to extract the isoflavones from the plant material; the alcohol extract containing the isoflavones is adsorbed onto a reverse phase matrix followed by specific desorption of the isoflavones from the matrix by a step grade elution, where the isoflavones are crystallized from the recovered eluent. Japanese Patent No. 1-258669 provides a process in which soybeans are soaked in warm water to convert isoflavones to their aglycone form; the aglycone isoflavones are then reflux-extracted from the soy material with an aqueous alcohol; the extracted liquid is condensed and dried; the dried material is dissolved in alcohol and adhered to a reverse-phase resin; and the isoflavones are eluted from the resin with an aqueous alcohol.

These methods, while satisfactory for separating and purifying isoflavones from a plant material, do not provide a method for recovering a purified protein material and isoflavones from a plant material containing both isoflavones and protein. Both methods utilize an alcohol solvent to extract the isoflavones from the plant material. Plant proteins such as soy protein are substantially insoluble in alcohol solutions, and will be left as a byproduct residue from the alcohol extraction, along with other plant materials insoluble in alcohol such as plant fiber materials.

U.S. Pat. No. 4,428,876 (the "'876 patent") provides a process for separating both plant proteins and flavanoids, including isoflavones, from a plant material containing flavanoids and protein. A plant material is extracted with an aqueous alkaline solution to form an extract containing the flavanoids and protein, and the extract is separated from unextractable and insoluble plant materials. The extract is applied on a non-polar or slightly polar adsorbent resin as it is, or after being acidified, to adsorb the flavanoids on the resin. Acidification causes the protein to be precipitated from the extract. If acidified, the precipitated protein is separated from the extract prior to application of the extract on the resin. After applying the extract on the resin, the resin is eluted with water and the eluent is collected to provide an eluent containing carbohydrates, and, if the extract was not acidified, protein. The water eluent is acidified to precipitate and separate the protein if the protein was not precipitated and separated from the extract prior to application on the resin. The flavanoids are then separated from the resin by eluting the resin with a polar solvent such as methanol or ethanol and collecting and concentrating the eluent.

Utilizing the process of the '876 patent, isoflavones and carbohydrates/protein are not separated cleanly due to the nature of the isoflavones, and the resin and eluents used in the process. As shown in FIGS. 1 & 2, isoflavones are relatively polar compounds, particularly in their natural glycoside or glycoside conjugate forms. Due to their polar nature, the isoflavones adsorb weakly to the non-polar or slightly polar resin. In an aqueous environment, the protein and carbohydrates are also relatively polar compounds which do not bind particularly strongly to the resin. Therefore, adsorbtion of the isoflavones, carbohydrates, and proteins to the resin, itself, is not effective to provide good separation of the compounds upon elution of the resin with a solvent since the compounds are easily displaced from the resin, and are not particularly differentiated from each other by interactions with the resin.

The process of the '876 patent will provide separation of some of the isoflavones from the protein and carbohydrates due to the relative solubility of the isoflavones in the eluent. For example, if the eluent initially used is water, and the extract is an extract of soy (which contains the isoflavones genistein and daidzin, among others), genistein will be sparingly eluted with protein and carbohydrates since genistein is only slightly soluble in water, however, daidzin will be eluted with the protein and carbohydrates since daidzin is soluble in water.

What is needed, therefore, is an effective, commercially viable process for cleanly separating and recovering protein and isoflavones from a plant material containing the same.

SUMMARY OF THE INVENTION

The invention provides an improved method of separating and collecting isoflavones and protein from a plant material which can be efficiently and economically performed on a commercial scale. The method involves separating and collecting isoflavones and a plant protein by contacting a clarified plant protein extract containing isoflavones and protein with a polar ion exchange resin; allowing the isoflavones to bind with the polar ion exchange resin; separating and recovering an isoflavone depleted protein extract from the ion exchange resin; and separating and recovering the isoflavones from the ion exchange resin. In a preferred embodiment, the separated and recovered isoflavones are converted to their aglucone form.

DESCRIPTION OF THE PREFERRED EMBODIMENTS

Figure 1:
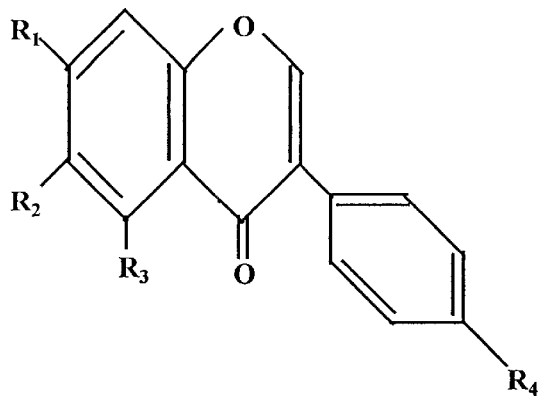
FIG. 1 is a molecular representation of an aglucone isoflavone.
Figure 2:
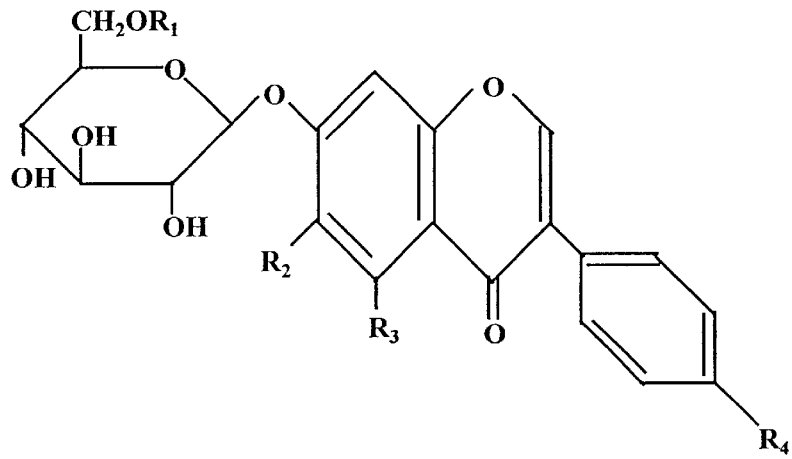
FIG. 2 is a molecular representation of an isoflavone glycoside.

An important feature of this invention is that isoflavones are separated from plant protein by contacting a clarified plant protein extract with a polar ion exchange resin, rather than a non-polar or slightly polar resin. Use of a polar ion exchange resin greatly facilitates clean separation and collection of protein and the isoflavones since the isoflavones adsorb strongly to the polar resin due to their polar nature, and are well differentiated from the protein upon elution of the extract through the resin.

Another important feature of the invention is that both an isoflavone-depleted protein material and the isoflavones are collected, rather than just one of the materials. The present invention utilizes a clarified protein extract as a substrate to be contacted with a polar ion exchange resin. The clarified protein extract, unlike alcohol extracts of plant materials containing isoflavones and protein, contains significant amounts of both protein and isoflavones. Significant economic efficiencies can be achieved with the process of the present invention since two desirable materials in a plant material can be separated and recovered simultaneously.

A clarified plant protein extract for use in the process of the present invention may be prepared by extracting a plant material containing protein and isoflavones with an aqueous extractant having a pH above the isoelectric point of the protein to solubilize the protein and the isoflavones in the extractant. The liquid extractant containing the solubilized isoflavones and protein is then separated from plant/materials which are not soluble in the extractant—such as lignan, cellulose, plant fibers, and insoluble hemicelluloses—to form the clarified extract. Preferably the clarified extract is separated from insoluble plant materials by filtration or by centrifugation and decantation of the supernatant extract from the insoluble materials. The resulting clarified protein extract contains soluble protein from the plant material and at least one of the isoflavone compounds selected from genistein, daidzein, glycitein, biochanin A, formononetin, and their natural glycosides and glycoside conjugates and is substantially free of insoluble protein material. As used herein, an isoflavone glycoside refers to a compound which comprises a glucose moiety covalently bonded to an aglucone isoflavone moiety, and an isoflavone glycoside conjugate refers to an isoflavone glycoside ester and includes the compounds 6"-O-Mal genistin, 6"-O-Ac genistin, 6"-O-Mal daidzin, 6"-O-Ac daidzin, and 6"-O-Mal glycitin.

Plant materials which contain protein and isoflavones which may be used to form a clarified extract include, but are not limited to, one or more of the following plant materials: soybean, chick pea, ground pea, marama bean, sword bean, jack bean, seaside sword bean, caraobean, cluster bean, hyacinth bean, grass pea, garden pea, djenko bean, goa bean, yam bean, broad bean, earth pea, lentil, jumping bean, velvet bean, African locust bean, other legumes, and derivatives of such plant materials, including defatted soy flakes, soy flour, and soy meal. Most preferably the plant material is a soybean material or a derivative of soybeans, most preferably commercially available defatted soy flakes, due to the high protein and isoflavone content present in soybeans.

In a most preferred embodiment, a clarified soy protein extract is prepared for use in the method of the present invention. Commercially available soy flour, soy meal, soy grit, or defatted soy flakes are utilized as the starting material. Preferably the soy material has been treated with a sulfite such as sodium sulfite for improved flow characteristics and improved microbial control. The soy material is extracted with an aqueous solution having a pH of from about 6 to about 12, preferably an aqueous sodium hydroxide solution having a pH of from about 8 to about 11. The weight ratio of the extractant to the soy material is from about 3:1 to about 20:1, and preferably is from about 8:1 to about 16:1. The clarified soy protein extract is preferably separated from insoluble soy materials by filtration, or centrifugation and decantation of the extract from the insoluble materials.

In accordance with the method of this invention, the clarified protein extract solution is contacted with a polar ion exchange resin to allow the isoflavones in the extract to bind with the resin. Preferably the resin is packed in a column having an inlet port and an outlet port, where the extract is contacted with the resin by loading the extract onto the resin through the inlet port of the column, and the eluted extract is collected from the resin at the outlet port of the column.

It is preferred that an anionic ion exchange resin be utilized for the process, most preferably a type II macroporous strong base anion exchange resin, although a weak base anion exchange resin may be used. As used herein a type II strong base anion exchange resin is defined as a quaternary ammonium type of resin in which the four substituents of the nitrogen atom are an ethanol group, two methyl groups, and a polymeric benzyl group. Commercially available type II strong base anion exchange resins include IRA 910 available from Rohm & Haas, Independence Mall West, Philadelphia, Pa. 19105; Dowex 22 available from Dow Chemical U.S.A., 2040 Willard H. Dow Center, Midland Mich. 48674; and Ionac A651 available from Sybron, Sybron Chemical Division, Birmingham Road, Birmingham, N.J. 08011. A commercially available weak base anion exchange resin which may be used in the process of the present invention is Duolite A-7 from Rohm & Haas.

Suitable methods for conditioning the polar anion exchange resin are set forth in U.S. Pat. No. 5,248,804, which is incorporated by reference herein. A preferred technique for conditioning the anion exchange resin involves exposing the resin to an agent which strips the surface of the resin of residue and converts the resin to a hydroxide form, thereafter exposing the resin to an agent which converts the resin to either a chloride form or a sulfate form, and thereafter exposing the resin to an agent which converts at least some of the strong base sites to a carbonate form and converts weak base sites to a free base form. A suitable agent which strips the surface of the resin of residue and converts the resin to a hydroxide form is a sodium hydroxide solution. A suitable agent which converts the resin to a chloride form is hydrochloric acid, preferably a 1% solution of hydrochloric acid, and a suitable agent to convert the resin to a sulfate form is sulfuric acid, preferably 1% sulfuric acid. Examples of suitable agents which convert at least some of the strong base sites to the carbonate form and convert weak base sites to the free base form include sodium carbonate, sodium bicarbonate, and ammonium hydroxide.

After contacting the clarified protein extract with the ion exchange resin to allow the isoflavones to bind with the resin, an isoflavone depleted protein extract is separated and collected from the ion exchange resin, preferably by eluting the resin with an aqueous solution adjusted to the pH of the extract and collecting the eluent. In a preferred embodiment, at least a majority of the protein material in the clarified extract is collected in the eluent as an isoflavone depleted protein extract. More preferably substantially all of the protein material in the clarified extract is collected in the eluent as an isoflavone depleted protein extract, where "substantially all" is defined as at least 80%, and more preferably at least 90%. If desired, an isoflavone depleted protein material may be recovered from the extract by spray-drying the extract.

In a preferred embodiment, an isoflavone depleted protein material may be precipitated from the isoflavone depleted protein containing extract separated and collected from the ion exchange resin. The pH of the extract is adjusted to about the isoelectric point of the protein to precipitate the protein. If the protein in the extract is a soy protein, the extract may be adjusted to a pH of from about 4 to about 5 to precipitate the protein. The precipitated protein may then be neutralized by adjusting the pH of the extract containing the precipitated protein to about pH 7. The precipitated protein, whether neutralized or not, is then separated from the liquid portion of the extract by conventional means, preferably by filtration or by centrifugation and decantation of the liquid portion of the extract from the protein precipitate. The separated isoflavone depleted protein material is then dried by conventional means, preferably by spray drying.

After separation of the isoflavone depleted protein containing extract from the ion exchange resin, the isoflavones are separated and collected from the resin, preferably by eluting the resin with a solvent selected from methanol, ethanol, propanol, isopropyl alcohol, isobutyl alcohol, butanol, ethyl acetate, acetonitrile, acetone, aqueous mixtures of the foregoing solvents, methylene chloride, chloroform, carbon tetrachloride, or a mixture of any of the foregoing solvents, and collecting an eluent containing the isoflavones. In a preferred embodiment at least a majority of the isoflavones in the clarified protein extract are recovered from the ion exchange resin in the isoflavone containing eluent, and more preferably substantially all of the isoflavones in the clarified protein extract are recovered in the isoflavone containing eluent, where "substantially all" is defined as at least 80%, and more preferably at least 90%.

The isoflavones may be recovered from the isoflavone containing eluent separated from the resin by concentrating the isoflavone containing eluent. In one embodiment the isoflavone containing eluent is concentrated under vacuum, heating, or both to remove the solvent, providing a residue of concentrated isoflavones. In another embodiment, the eluent is concentrated under vacuum, heating, or both to about 10% to 25% of its original volume. At least an equal volume of water, preferably chilled to a temperature of from about 2° C. to about 15° C., is then added to the concentrated eluent to precipitate the isoflavones. The precipitated isoflavones may then be recovered from the eluent/water mixture by filtration or centrifugation.

In a most preferred embodiment, the isoflavones in the collected isoflavone containing eluent are treated so that substantially all of the isoflavones in the eluent are aglucone isoflavones. Aglucone isoflavones have been found to be significantly more biologically active in health benefit applications than their natural glycosides or glycoside conjugate forms, therefore it is desirable to recover the isoflavones in their aglucone form. Aglucone isoflavones are also less soluble in water than their glycoside or glycoside conjugate forms, therefore the aglucone isoflavones may be more easily separated from the isoflavone containing eluent.

Isoflavone glycoside conjugates in the isoflavone containing eluent may be converted to isoflavone glycosides by treating the isoflavone containing eluent for a period of time under temperature and pH conditions effective to cause the conversion. The pH range for conversion of the isoflavone glycoside conjugates to isoflavone glycosides in the isoflavone containing eluent is from about 6 to about 13.5. The pH of the isoflavone containing eluent should be adjusted to the desired pH, if necessary, with a suitable basic or acidic reagent. The conversion of isoflavone glycoside conjugates to isoflavone glycosides has been found to be base catalyzed, so it is most preferred to use a high pH to achieve rapid conversion. The most preferred pH for the conversion of the isoflavone glycoside conjugates to isoflavone glycosides is a pH of about 9 to about 11.

The temperature range for conversion of the isoflavone glycoside conjugates to isoflavone glycosides in the isoflavone containing eluent is from about 2° C. to about 121° C. The temperature range at which the conversion readily occurs depends on the pH of the isoflavone containing eluent. The conversion occurs easily at lower temperatures when the pH is relatively high. For example, at a pH of about 11 the conversion occurs rapidly and efficiently at a temperature range of about 5° C. to about 50° C. At a pH of about 9 conversion occurs efficiently within a temperature range of about 45° C. to about 75° C. When the pH of the isoflavone containing eluent is relatively low, the conversion occurs at higher temperatures. For example, at a pH of about 6, the conversion occurs within a temperature range of about 80° C. to about 121° C. In a most preferred embodiment, the conversion is effected at a pH of about 11 and a temperature of about 35° C.

The time period required for conversion of the isoflavone glycoside conjugates to isoflavone glycosides depends primarily upon the pH and temperature range utilized to effect the conversion. Such conversion times range from about 15 minutes up to several hours or longer. Conversion occurs more rapidly at a higher pH and at a higher temperature. In a most preferred embodiment, substantially all of the isoflavone glycoside conjugates are converted to isoflavone glycosides in about 30 minutes to about 1 hour at a pH of about 11 and a temperature of about 35° C.

Isoflavone glycosides in the isoflavone containing eluent may be converted to their corresponding aglucone isoflavones, preferably after converting the isoflavone glycoside conjugates to isoflavone glycosides, by contacting the isoflavone glycosides in the isoflavone containing eluent with a β-glucosidase enzyme which is effective to cleave 1,4-glucoside bonds for a period of time at a selected temperature and pH. Such enzymes can be derived from, for example, *Aspergillus niger*, *Aspergillus oryzae*, *Kluyveromyces lactis*, and *Kluyveromyces fragilis*. Particularly preferred commercially available enzymes effective for converting the isoflavone glycosides to aglucone isoflavones are: Biopectinase 100L (which is preferably utilized at a pH range of from about 3 to about 6), Biopectinase 300L (optimum pH range from about 3 to about 6), Biopectinase OK 70L (optimum pH range from about 3 to about 6), Biolactase 30,000 (optimum pH range from about 3 to about 6) and Neutral Lactase (optimum pH range from about 6 to about 8), all of which are available from Quest International, 1833 57th Street, Post Office Box 3917, Sarasota, Fla. 34243. Also especially preferred are Lactase F (which is preferably utilized at a pH range of from about 4 to about 6), and Lactase 50,000 (optimum pH range from about 4 to about 6), both available from Amano International Enzyme Co., Inc., Post Office Box 1000, Troy, Va. 22974. Other particularly preferred enzymes include Lactozyme 3000L (which preferably is utilized at a pH range of from about 6 to about 8), and Alpha-Gal 600L (which preferably is utilized at a pH of from about 4 to about 6.5), available from Novo Nordisk Bioindustrials, Inc., 33 Turner Road, Danbury, Conn. 06813; Maxilact L2000 (which is preferably utilized at a pH range of from about 4 to about 6), available from Gist Brocades Food Ingredients, Inc., King of Prussia, Pa., 19406; Neutral Lactase (which is preferably utilized at a pH range of from about 6 to about 8), available from Pfizer Food Science Group, 205 East 42nd Street, New York, N.Y. 10017; and Enzeco Fungal Lactase Concentrate (which is preferably utilized at a pH range of from about 4 to about 6), available from Enzyme Development Corporation, 2 Penn Plaza, Suite 2439, New York, N.Y. 10121. Certain gluco-amylase enzymes can be utilized instead of, or in addition to, the previously noted enzymes. A commercially available gluco-amylase enzyme which effects the conversion is G-Zyme G990 (which preferably is used as a pH range of from about 4 to about 6), available from Enzyme Development Corporation. Preferably from about 0.1% to about 10% of the enzyme material is added to the isoflavone containing eluent, by weight, to effect the conversion.

The pH range for conversion of the isoflavone glycosides to aglucone isoflavones in the isoflavone containing eluent is from about pH 3 to 9. The pH that is utilized depends primarily upon the type of enzyme that is used, and should be selected accordingly. Typically the enzymes are active either in a neutral pH range from about 6 to 8, or in an acidic pH range from about 3 to 6. The pH of the isoflavone containing eluent may be adjusted to the appropriate pH range with conventional acidic and basic reagents.

The temperature range for conversion of the isoflavone glycosides to aglucone isoflavones is from about 5° C. to about 75° C. The temperature significantly affects the activity of the enzyme, and therefore, the rate of conversion, where higher temperatures increase the rate of conversion. The enzymes may be active above 70° C., for example Alpha-Gal 600L is active at 75° C., however, it is preferred to conduct the conversion at slightly lower temperatures, preferably from about 50° C. to about 65° C., to avoid enzyme deactivation.

The time required to effect the conversion of the isoflavone glycosides to aglucone isoflavones depends upon enzyme related factors, particularly enzyme activity and concentration, as well as the temperature and pH of the system. Preferably the conversion of substantially all the isoflavone glycosides to aglucone isoflavones is effected within 5 hours, and more preferably from about 1 to 2 hours.

The resulting aglucone isoflavones can be separated from the isoflavone containing eluent as described above. The aglucone isoflavones are more easily separated from the concentrated isoflavone containing eluent with chilled water since the aglucone isoflavones are less soluble in water than their corresponding isoflavone glycoside conjugates or isoflavone glycosides.

It will be apparent to those skilled in the art that various modifications to the preferred embodiment of the invention as described herein can be made without departing from the spirit or scope of the invention as defined by the appended claims.

What is claimed is:

1. A method for separating and recovering isoflavones and protein from a plant material, comprising:

contacting a clarified plant protein extract containing plant protein and isoflavones of said plant material with an anionic ion exchange resin to bind said isoflavones with the anionic ion exchange resin;

separating and collecting an isoflavone depleted protein extract containing said plant protein from the anionic ion exchange resin, said separated isoflavone depleted protein extract being depleted in isoflavones relative to the initial clarified protein extract; and separating and collecting said isoflavones from said anionic ion exchange resin after separation of said isoflavone depleted protein extract from said anionic ion exchange resin.

2. The method of claim 1 further comprising the step of adjusting the pH of said isoflavone depleted protein extract to about the isoelectric point of the protein, whereby the protein is precipitated.

3. The method of claim 2 wherein said protein is soy protein and the pH is adjusted to a value of from about 4 to about 5 to precipitate the protein.

4. The method of claim 2 wherein the precipitated protein is separated from a liquid portion of the isoflavone depleted protein extract.

5. The method of claim 4 wherein the precipitated protein separated from the liquid portion of the isoflavone depleted protein extract is neutralized.

6. The method of claim 4 wherein the precipitated protein separated from the liquid portion of the isoflavone depleted protein extract is dried.

7. The method of claim 1 wherein the anioncion exchange resin is a type II macroporous anionic exchange resin selected from the group consisting of weak base and strong base anion exchange resins.

8. The method of claim 1 wherein, prior to contacting the clarified protein extract with the anionic ion exchange resin, the anionic ion exchange resin is conditioned by exposing the resin to an agent which converts the resin to a hydroxide form, the hydroxide form resin is treated with an agent which converts the hydroxide form resin to a chloride or sulfate form resin, and the chloride or sulfate form resin is treated with an agent which converts at least some strong base sites of the resin to a carbonate form.

9. The method of claim 1, wherein said isoflavones include at least one of the isoflavone compounds selected from the group consisting of genistein, daidzein, glycitein, biochanin A, formononetin, and their natural glycosides and glycoside conjgates.

10. The method of claim 1 wherein said isoflavones are separated from said anionic ion exchange resin by washing said isoflavones from said resin with a solvent selected from the group consisting of methanol, ethanol, propanol, isopropyl alcohol, isobutyl alcohol, butanol, ethyl acetate, acetonitrile, acetone, methylene chloride, chloroform, carbon tetrachloride, and mixtures thereof.

11. The method of claim 1, further comprising treating said separated isoflavones at a temperature and a pH for a period of time effective to convert isoflavone glycoside conjugates to isoflavone glycosides.

12. The method of claim 1, further comprising contacting said separated isoflavones with a β-glucosidase enzyme at a temperature and a pH for a period of time effective to convert isoflavone glycosides to aglucone isoflavones.

13. The method of claim 1 wherein at least a majority of said protein in said clarified plant protein extract is separated and recovered from said anionic ion exchange resin in said isoflavone depleted protein extract.

14. The method of claim 13 wherein substantially all of said protein in said clarified plant protein extract is separated and recovered from said anionic ion exchange resin in said isoflavone depleted protein extract.

15. The method of claim 1 wherein at least a majority of said isoflavones in said clarified protein extract are separated and recovered from said anionic ion exchange resin.

16. The method of claim 15 wherein substantially all of said isoflavones in said clarified protein extract are separated and recovered from said anionic ion exchange resin.

17. A method for separating and recovering isoflavones and plant protein from a plant material containing protein and isoflavones, comprising:

preparing a clarified protein extract containing solubilized plant protein and isoflavones;

contacting the clarified protein extract with anionic ion exchange resin;

allowing said isoflavones to bind with said anionic ion exchange resin whereby said clarified protein extract is depleted of isoflavones to form an isoflavone depleted protein extract containing said plant protein, where said isoflavone depleted protein extract is depleted of isoflavones relative to said clarified protein extract;

separating and recovering said isoflavone depleted protein extract from said anionic ion exchange resin; and separating and recovering said isoflavones from said anionic ion exchange resin.

18. The method of claim 17 wherein said clarified protein extract is prepared by extracting a plant material containing protein and isoflavones with an aqueous extractant having a pH above the isoelectric point of said protein to solubilize said protein and said isoflavones in said extractant; and thereafter separating the liquid extractant containing the solubilized protein and isoflavones from insoluble plant matter.

19. The method of claim 18 wherein said plant material is selected from the group consisting of soy flakes, soy flour, soy meal, soy grit, soybeans, and mixtures thereof; said aqueous extractant has a pH from about 6 to about 12; and said clarified protein extract is a soy protein extract.

20. The method of claim 17 further comprising the step of adjusting the pH of said isoflavone depleted protein extract to about the isoelectric point of the protein, whereby the protein is precipitated.

21. The method of claim 20 wherein the plant protein is soy protein and the pH is adjusted to a value of from about 4 to about 5 to precipitate the protein.

22. The method of claim 20 wherein the precipitated protein is separated from a liquid portion of the isoflavone depleted protein extract.

23. The method of claim 22 wherein the precipitated protein separated from the liquid portion of the isoflavone depleted protein extract is neutralized.

24. The method of claim 22 wherein the precipitated protein separated from the liquid portion of the isoflavone depleted protein extract is dried.

25. The method of claim 17 wherein the anion ion exchange resin is a type II macroporous anion exchange resin selected from the group consisting of weak base and strong base anion exchange resins.

26. The method of claim 17 wherein, prior to contacting the clarified protein extract with the anionic ion exchange resin, the anionic ion exchange resin is conditioned by exposing the resin to an agent which converts the resin to a hydroxide form, the hydroxide form resin is treated with an agent which converts the hydroxide form resin to a chloride or sulfate form resin and the chloride or sulfate form resin is treated with an agent which converts at least some strong base sites of the resin to a carbonate form.

27. The method of claim 17 wherein said isoflavones include at least one of the isoflavone compounds selected from the group consisting of genitein, daidzein, glycitein, biochanin A, formononetin, and their natural glycosides and glycoside conjugates.

28. The method of claim 17 wherein said isoflavones are separated from said anionic ion exchange resin by washing said isoflavones from said resin with a solvent selected from the group consisting of methanol, ethanol, propanol, isopropyl alcohol, isobutyl alcohol, butanol, ethyl acetate, acetonitrile, acetone, methylene chloride, chloroform, carbon tetrachloride, and mixtures thereof.

29. The method of claim 17, further comprising treating said separated isoflavones at a temperature and a pH for a period of time effective to convert isoflavone glycoside conjugates to isoflavone glycosides.

30. The method of claim 17, further comprising contacting said separated isoflavones with a β-glucosidase enzyme at a temperature and a pH for a period of time effective to convert isoflavone glycosides to aglucone isoflavones.

31. The method of claim 17 wherein at least a majority of said protein in said clarified protein extract is separated and recovered from said anionic ion exchange resin in said isoflavone depleted protein extract.

32. The method of claim 31 wherein substantially all of said protein in said clarified protein extract is separated and recovered from said anionic ion exchange resin in said isoflavone depleted protein extract.

33. The method of claim 17 wherein at least a majority of said isoflavones in said clarified protein extract are separated and recovered from said anionic ion exchange resin.

34. The method of claim 33 wherein substantially all of said isoflavones in said clarified protein extract are separated and recovered from said anionic ion exchange resin.

* * * * *